US005518842A

United States Patent [19]

Fey et al.

[11] Patent Number: 5,518,842
[45] Date of Patent: May 21, 1996

[54] INVERSE SPINEL COMPOUNDS AS CATHODES FOR LITHIUM BATTERIES

[75] Inventors: George T. Fey, Tao-Yuan, Taiwan; Jeffrey R. Dahn, British Columbia, Canada

[73] Assignee: Moli Energy (1990) Limited, Canada

[21] Appl. No.: 324,676

[22] Filed: Oct. 18, 1994

[30]     Foreign Application Priority Data

Nov. 9, 1993 [CA] Canada ................................... 2102738

[51] Int. Cl.$^6$ ................................................ H01M 4/02
[52] U.S. Cl. .......................................... 429/218; 429/232
[58] Field of Search ....................................... 429/218, 232

[56]                 References Cited

U.S. PATENT DOCUMENTS

| | | | |
|---|---|---|---|
| 4,366,215 | 12/1982 | Coetzen et al. | 429/199 |
| 5,160,712 | 11/1992 | Thackeray et al. | 423/138 |
| 5,192,629 | 3/1993 | Guyomard et al. | 429/197 |
| 5,196,279 | 3/1993 | Tarascon | 429/194 |

OTHER PUBLICATIONS

J. M. Tarascon and D. Guyomard, "The $Li_{1+x}Mn_2O_4$/C Rocking–Chair System: A Review", Electrochimica Acta, 38 1221 (1993) Month unknown.

Bernier et al., from "Comptes Rendus", 253 1578 (1961) Month unknown.

*Primary Examiner*—Stephen Kalafut
*Assistant Examiner*—Richard H. Lilley, Jr.
*Attorney, Agent, or Firm*—Lerner, David, Littenberg, Krumholz & Mentlik

[57]                 ABSTRACT

High voltage lithium batteries can be made using lithium transition metal oxides having an inverse spinel structure as a cathode material wherein lithium atoms occupy up to half of the 16d sites, oxygen atoms occupy the 32e sites, and transition metal atoms occupy the 8a sites and about half of the 16d sites in said inverse spinel structure. In particular, these inverse spinel compounds can be suitable for use in lithium ion batteries. Along with high operating voltage, such batteries can exhibit reasonable capacity, great capability and reversibility.

15 Claims, 7 Drawing Sheets

INVERSE SPINEL COMPOUNDS AS CATHODES FOR LITHIUM BATTERIES

FIELD OF THE INVENTION

The invention relates to the field of batteries. Specifically, it relates to materials for novel use as cathodes in lithium batteries.

BACKGROUND OF THE INVENTION

Lithium batteries are commercially available in a variety of sizes employing many different electrochemistries. The increasing demand for such batteries results in great part from the high voltage of individual cells and the high energy density that generally characterizes these types of batteries. Small primary batteries employing lithium metal anodes are often employed in applications involving consumer electronics. Large lithium metal anode batteries are used in remote or military applications but are considered too dangerous for consumer usage. Rechargeable lithium batteries can offer many advantages over competing rechargeable non-lithium batteries or primary (non-rechargeable) lithium batteries. Interest in lithium ion type batteries in particular, wherein two different lithium insertion compounds are used as cathode and anode, has increased dramatically. The first commercial product based on a lithium ion type electrochemistry has recently been made available by Sony Energy Tec Inc.

Lithium ion electrochemistries under development generally employ a partially graphitized carbon or graphite as the anode, an air stable lithium transition metal oxide as the cathode, and a suitable non-aqueous electrolyte. Batteries made with such electrochemistries generally contain no metallic lithium on assembly. The lithium to be cycled as ions during operation of the battery is normally incorporated into one of the electrodes. Lithiated carbons or graphites are not stable in air however. The inserted lithium therein has a small binding energy and is extracted and reacts when exposed to air. Thus, it is difficult to use lithiated carbons or graphites in a manufacturing process for lithium ion batteries. Instead, all the lithium is normally incorporated into the cathode since many suitable lithium transition metal oxide materials can be prepared and are stable in air. An additional requirement of a lithium transition metal oxide to be used as a cathode is that the lithium ions are mobile and thus can be quickly extracted electrochemically.

Examples of suitable cathode materials for lithium ion batteries include $LiNiO_2$, $LiCoO_2$ and $LiMn_2O_4$. The theoretical capacities for these materials are 275, 274, and 148 mAh/gram respectively, if all the lithium present could be used. However, for $LiNiO_2$ and $LiCoO_2$ only about ½ of the theoretical capacity can be used in a reversible manner. Further reversible lithiation of some of these materials is possible, thereby extending the capacity available per mole of cathode material. $LiNiO_2$, for example, can be further lithiated to $Li_2NiO_2$, but the latter compound is not stable in air. $LiMn_2O_4$ can be further lithiated to $Li_2Mn_2O_4$. U.S. Pat. No. 5,196,279 teaches the use of $Li_{1+x}Mn_2O_4$ as a cathode material for lithium ion batteries.

One of the attractive features of the present lithium ion electrochemistries is the high voltage provided by a single cell. Many electronic circuits require voltages of 3 V or 6 V for their operation. A battery to power such circuits could consist of series connected strings of 3 or 5 nickel-cadmium cells (1.2 V per cell) respectively or by 1 or 2 three volt lithium ion cells respectively. Use of the latter greatly simplifies the battery assembly and packaging required for such applications with a corresponding possible significant reduction in overall battery cost. In general, increasing the voltage of a single cell leads to a requirement for fewer series connected cells in a battery application, which is obviously desirable. Additionally, higher voltage is generally desirable for increased energy density, since the stored energy in a battery is given by the product of the average battery voltage times the capacity.

The voltage of a lithium ion battery is determined by the difference between the chemical potential of the inserted lithium in each of the two electrodes. To maximize the battery voltage, it is thus desirable to maximize this difference in chemical potential. For example, in the battery based on $Li_xMn_2O_4$/graphite ($Li_yC_6$) electrochemistry described by J. M. Tarascon et al, Electrochimica Acta 38, 1221 (1993), the chemical potentials are approximately −4.1 ev and −0.1 ev versus metallic lithium for $Li_xMn_2O_4$ and $Li_yC_6$ respectively. These chemical potentials reflect the binding energies of lithium within the respective insertion hosts measured with respect to lithium in lithium metal. The lithium in $Li_xMn_2O_4$ is much more tightly bound than is the lithium in $Li_yC_6$. The resulting voltage across the terminals of the battery is thus about 4.1−0.1 or 4 volts, with the $Li_xMn_2O_4$ electrode as positive.

Practical application of such high voltage lithium ion electrochemistries is made difficult as a result of stability problems with other battery components at these voltages. Both the electrolyte and the hardware are subject to oxidation at the cathode, thus placing limitations on the choice of both. Aluminum appears to be a practical material for cathode hardware in most electrochemical systems. The problem of selecting an electrolyte that combines oxidation resistance along with other requirements (such as safety) remains an issue. Guyomard et al, U.S. Pat. No. 5,192,629 show how the judicious selection of the proper electrolyte can minimize oxidation for a given system. The system described therein included a carbon anode and a $LiMn_2O_4$ cathode with an electrolyte based on dimethyl carbonate and ethylene carbonate solvents and preferably $LiPF_6$ salt.

Lithium transition metal oxides with an atomic structure known as inverse spinel have been described in the literature as early as 1961 (eg. Bernier et al, Comptes Rendus, 253, 1578), however it appears that these materials have never been considered for use as electrodes in lithium batteries. This may be a result of the inverse spinel structure differing significantly from that of the more familiar compounds $LiNiO_2$, $LiCoO_2$ and $LiMn_2O_4$ and appearing to be unsuited for use as battery electrodes.

SUMMARY OF THE INVENTION

The inventors have discovered that lithium transition metal oxides having an inverse spinel structure can be suitable for use as a cathode material in lithium batteries. Two such oxides, $LiNiVO_4$ and $LiCoVO_4$, have been synthesized and tested in coin cell size lithium batteries. The high voltage of these batteries was demonstrated along with reasonable capacity and rate capability. Also, although problems were encountered with reversibility of some of the complete electrochemical systems tested, the cathode material itself seemed reasonably reversible.

The invention batteries can be primary (non-rechargeable) or rechargeable types comprising an anode, an electrolyte, and a cathode wherein a portion of the cathode comprises a lithium transition metal oxide having an inverse spinel structure. The lithium transition metal oxide can be LiNiVO$_4$, LiCoVO$_4$ or LiCuVO$_4$.

However, it is expected that the lithium transition metal oxide can be any solid solution compound having an inverse spinel structure and chemical formula Li$_x$M$_y$N$_z$O$_4$ wherein M and N are transition metals, y and z are numbers about equal to 1, and x is a number in the range from about 0 to 2. Additionally, it is expected that the solid solution compound can be one wherein minor amounts of other elements are substituted for M and N.

The anodes for the invention batteries can be selected from the group containing lithium metal, lithium alloys, and lithium insertion compounds. The electrolyte for the invention batteries comprises one or more lithium salts dissolved in a mixture of non-aqueous solvents. The lithium salts can be LiPF$_6$ and/or LiBF$_4$, and the solvents can be dimethyl carbonate and/or propylene carbonate and/or ethylene carbonate.

DETAILED DESCRIPTION OF SPECIFIC EMBODIMENTS OF THE INVENTION

LiNiO$_2$ and LiCoO$_2$ are members of the layered oxide structure class. They consist of close packed layers of oxygen, nickel or cobalt respectively, and lithium stacked in the following sequence The lithium atoms within the lithium layers can he extracted to form compounds Li$_z$NiO$_2$ or Li$_z$CoO$_2$ where $0<z\leq1$. In the case of non-stoichiometric lithium nickel oxide with an excess of nickel, Dahn et al. Solid State Ionics 44, 87 (1990) show that the excess nickel resides in the lithium layers. Furthermore, Canadian Patent Application No. 2,038,631 and U.S. Pat. No. 5,180,574 show that the extraction of the remaining lithium atoms in these layers is impeded, apparently by the presence of nickel in the layers. Thus, it seems important in these structures to keep the lithium layers free of immobile transition metal atoms.

Figure 1:
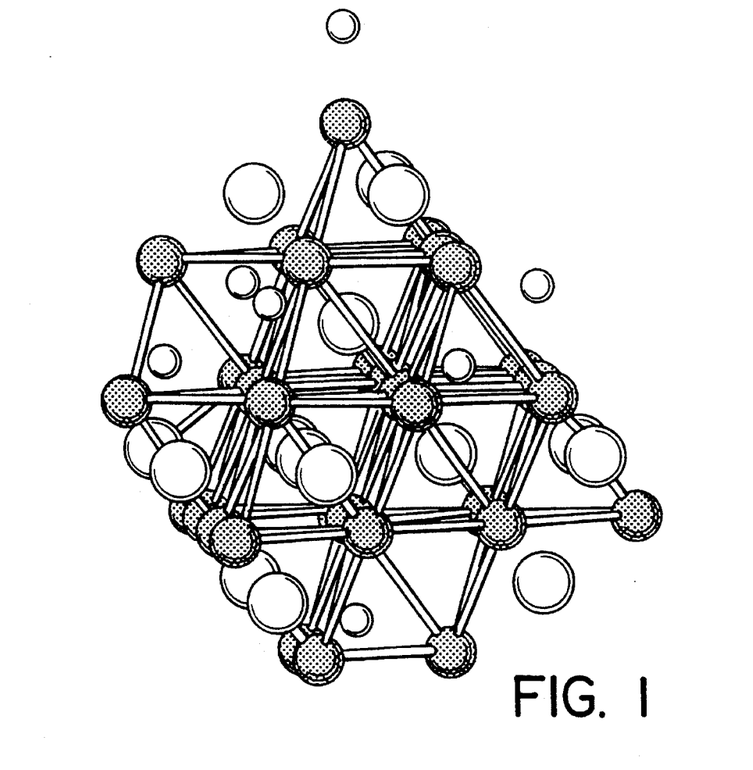
FIG. 1 shows the atom arrangement and site locations for compounds with either spinel or inverse spinel structures.
Figure 2:
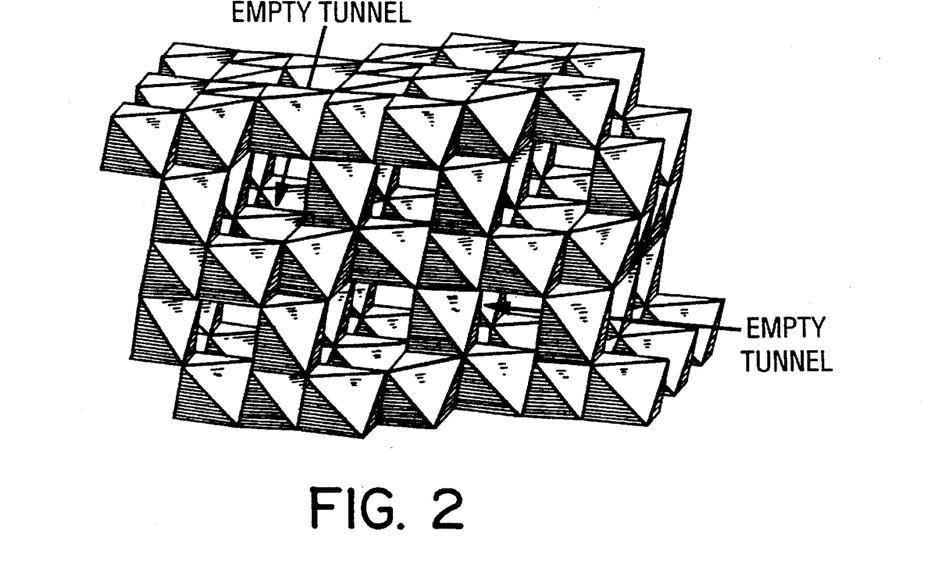
FIG. 2 illustrates the network of "tunnels" in the spinel structure of LiMn$_2$O$_4$.

LiMn$_2$O$_4$ has a spinel structure which differs from that of the layered LiNiO$_2$ and LiCoO$_2$ structures. In the standard Space Group convention (see the International Tables for X-ray Crystallography, Volume 1, The Kynoch Press, Birmingham, England, 1969) for crystal structure description, the spinel LiMn$_2$O$_4$ has space group Fd3m with Li atoms in 8$a$ sites, Mn atoms in 16$d$ sites, and oxygen atoms in 32$e$ sites. FIG. 1 shows the atom arrangement and site locations in such a structure. The small circles represent 8$a$ sites (or Li in this case), the large lightly-shaded circles represent 16$d$ sites, (or Mn in this case), and the large darkly-shaded circles represent 32$e$ sites (or O in this case). The Li atoms in this case lie along a network of "tunnels" and hence are mobile. FIG. 2 illustrates the network of tunnels where the shaded octahedra have oxygen atoms at each corner and a Mn atom at each centre. In FIG. 2, the Li atoms are not shown, but lie inside the otherwise "empty tunnels". By analogy with LiNiO$_2$ and LiCoO$_2$, the tunnels are free of large transition metals, apparently resulting in good Li mobility.

Compounds with structures of the inverse spinel type include LiNiVO$_4$, LiCoVO$_4$ and LiCuVO$_4$ (see R. G. Wyckoff "Crystal Structures", 2nd Edition, Volume 3, published by R. E. Kreiger Publishing Co., Malabar, Florida, U.S.A. (1981) and J. Preudhomme and P. Tarte, Spectrochimica Acta, 28a, 69 (1972)). These structures can also be represented using the illustration shown in FIG. 1. However, using LiNiVO$_4$ as an example, the oxygen atoms still reside in 32$e$ sites, but the Li atoms randomly fill half the 16$d$ sites. Based on the literature, it is believed that the Ni atoms fill the remaining half of the 16$d$ sites and that the V atoms fill the 8$a$ sites. Now there are no obvious "tunnels" available for Li motion and diffusion. The structures of LiCoVO$_4$ and LiCuVO$_4$ are similar to that of LiNiVO$_4$ (A. F. Corsmit and G. Blasse, Chemical Physics Letters, 20, 347 (1973)). Thus it appears that lithium transition metal oxides with the inverse spinel structure would be unsuited for use as a battery cathode.

Figure 3:
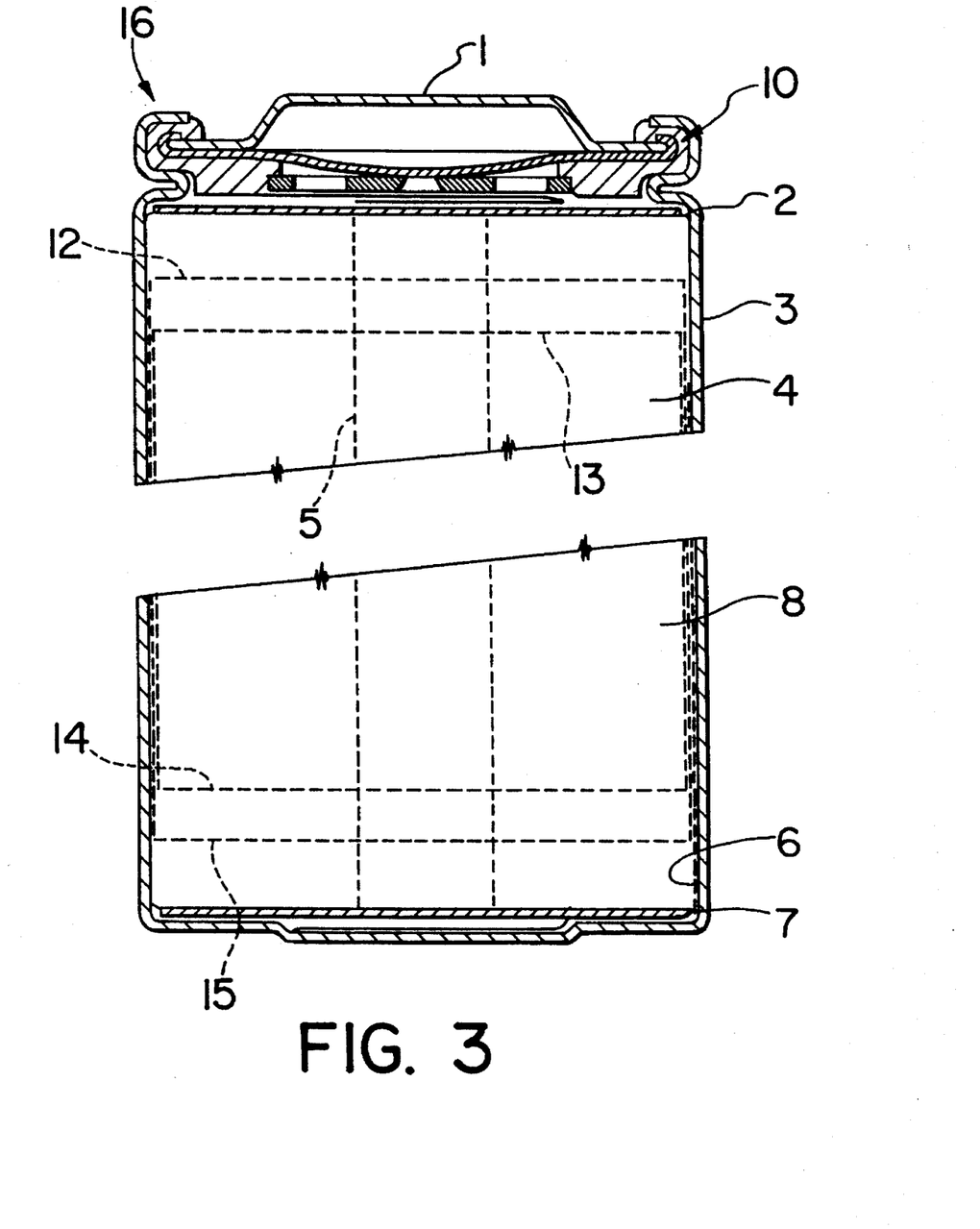
FIG. 3 depicts a cross sectional view of a preferred embodiment of the invention that is similar to commercially available lithium ion batteries.

A preferred embodiment of the invention battery is one with construction similar to that of commercially available lithium ion batteries. FIG. 3 shows a cross sectional view of such a battery 16 with wound type configuration. A jelly-roll 4 is created by spirally winding a cathode foil (not shown), an anode foil (not shown), and two microporous polyolefin film sheets (not shown) that act as separators.

Cathode foils are prepared by applying a lithium transition metal oxide material having an inverse spinel structure, possibly other powdered cathode material if desired, a binder, and a conductive dilutant mixture onto a thin aluminum foil. Typically, the application method first involves dissolving the binder in a suitable liquid carrier. Then, a slurry is prepared using this solution plus the other powdered solid components. The slurry is then coated onto the aluminum foil. Afterwards, the carrier solvent is evaporated away. Often, both sides of the aluminum foil substrate are coated in this manner and subsequently the cathode foil is calendered.

Anode foils are prepared in a like manner except that powdered carbonaceous material, either partially graphitized carbon or graphite, is used instead of cathode material, and thin copper foil is usually used instead of aluminum.

Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 3.

The jelly-roll 4 is inserted into a conventional battery can 3. A header 1 and gasket 10 are used to seal the battery 16. The header may include safety devices if desired. A combination safety vent and pressure operated disconnect device may be employed. FIG. 3 shows one such combination that is described in detail in Canadian Patent Application No. 2,099,657. The external surface of the header 1 is used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 to seal the battery, electrolyte 8 is added to fill the porous spaces in the jelly-roll 4.

Those skilled in the art will understand that the types of and amounts of the component materials must be chosen based on component material properties and the desired performance and safety requirements. In particular, it is expected that the choice of the electrolyte to be used will be critical to making a practical battery product. Other factors to consider include the significant irreversible electrochemical reactions that generally occur on the first recharge. Thus, an electrical conditioning step involving at least the first recharge is often part of the assembly process. Again, determination of an appropriate conditioning step as well as setting limitations on the operating parameters (such as voltage, current, and temperature limits) would be required of someone familiar with the field.

Other configurations or components are possible for the invention batteries. For example, a prismatic format for lithium ion batteries is considered desirable and possible. Other lithium insertion compounds may be used for the anode material instead of a carbonaceous material. Additionally, Li metal or Li alloys may be used as the anode material. However it is assumed that such batteries will pose a more significant safety risk. A laboratory coin cell version (small battery) of such a lithium metal anode based embodiment is given in the examples to follow.

Primary lithium batteries might also be made wherein lithium is extracted from the lithium transition metal oxide cathode prior to battery assembly. The cathode material would then be represented by the formula $Li_xM_yN_zO_4$ where x is less than 1. This extraction might be accomplished chemically (such as with acid treatment) or electrochemically.

Similarly, where the material properties allow the further insertion of lithium into the host, primary or rechargeable batteries might be made wherein a portion of the cathode is an oxide represented by the formula $Li_xM_yN_zO_4$ and wherein $1 < x \leq 2$. (By analogy, $LiMn_2O_4$ is an example of a lithium transition metal oxide having a spinel structure which can be further lithiated to $Li_2Mn_2O_4$.) Without wishing to be bound by theory, the inventors offer the following structural argument to indicate how further lithium might be inserted into such a material. If further lithium insertion is possible, it is expected that the additional lithium would enter 16c sites (not shown) in the structure of FIG. 1. Concurrently, it is expected that the N atoms would empty from the 8a sites and additionally fill 16c sites. Thus, a battery with an oxide cathode $Li_zM_yN_zO_4$ where ½ the 16c sites were filled with Li and ½ with N atoms might be possible.

Examples are presented in the following to illustrate certain aspects of the invention but should not be construed as limiting in any way. In these examples, two types of laboratory batteries were employed. These were a coin cell type and a special cell type used for x-ray diffraction analysis. In both cases, 125 μm thick lithium metal foil was used as an anode. Cathodes were made by uniformly coating a blend containing an appropriate inverse spinel powder, 10% by weight Super S (trademark of Chemetals Inc.) carbon black as a conductive dilutant, and 2% by weight polyvinylidene fluoride (PVDF) as a binder onto one side of an aluminum foil substrate.

A slurry containing n-methyl pyrrolidinone (NMP) solvent was initially made wherein appropriate amounts of the inverse spinel powder and carbon black are added to a binder solution containing 10% PVDF in NMP. Excess NMP was then added until the slurry viscosity is like that of a syrup, whereupon the slurry was then coated onto aluminum foil using a doctor blade spreader. NMP was then removed by drying in air @105° C. These electrodes were then compressed between flat plates at 100 bar pressure. Typical electrode thicknesses were about 120 μm. Square electrodes for use in the laboratory batteries were prepared by cutting 1.2 cm×1.2 cm pieces out of the larger samples using a precision cutting jig. Electrode squares were weighed, and the combined weight of foil, carbon black and PVDF were subtracted to obtain the active inverse spinel electrode mass.

The separator used in the example batteries was Celgard® 2502 microporous polypropylene film. Electrodes and separators were wetted with an appropriate electrolyte- Two different electrolyte compositions were used in these examples. This selection was made based on the resistance of these compositions to oxidation as described in the literature. The first was a solution of 1M $LiPF_6$ salt (from Hashimoto, Japan) dissolved in a solvent mixture of dimethyl carbonate (DMC), propylene carbonate (PC), and ethylene carbonate (EC) in a volume ratio of 50/25/25 respectively. Hereinafter, this will be referred to as electrolyte A. The second electrolyte used was a solution containing 1M $LiBF_4$ salt dissolved in a solvent mixture of DMC/EC/PC in a volume ratio of 66/17/17. Hereinafter, this will be referred to as electrolyte B. Use of both of these electrolytes is taught in the prior art of U.S. Pat. No. 5,192,629, but it is expected that oxidation may still occur in batteries where the voltage exceeds 5.0 V with respect to lithium metal.

Figure 4:
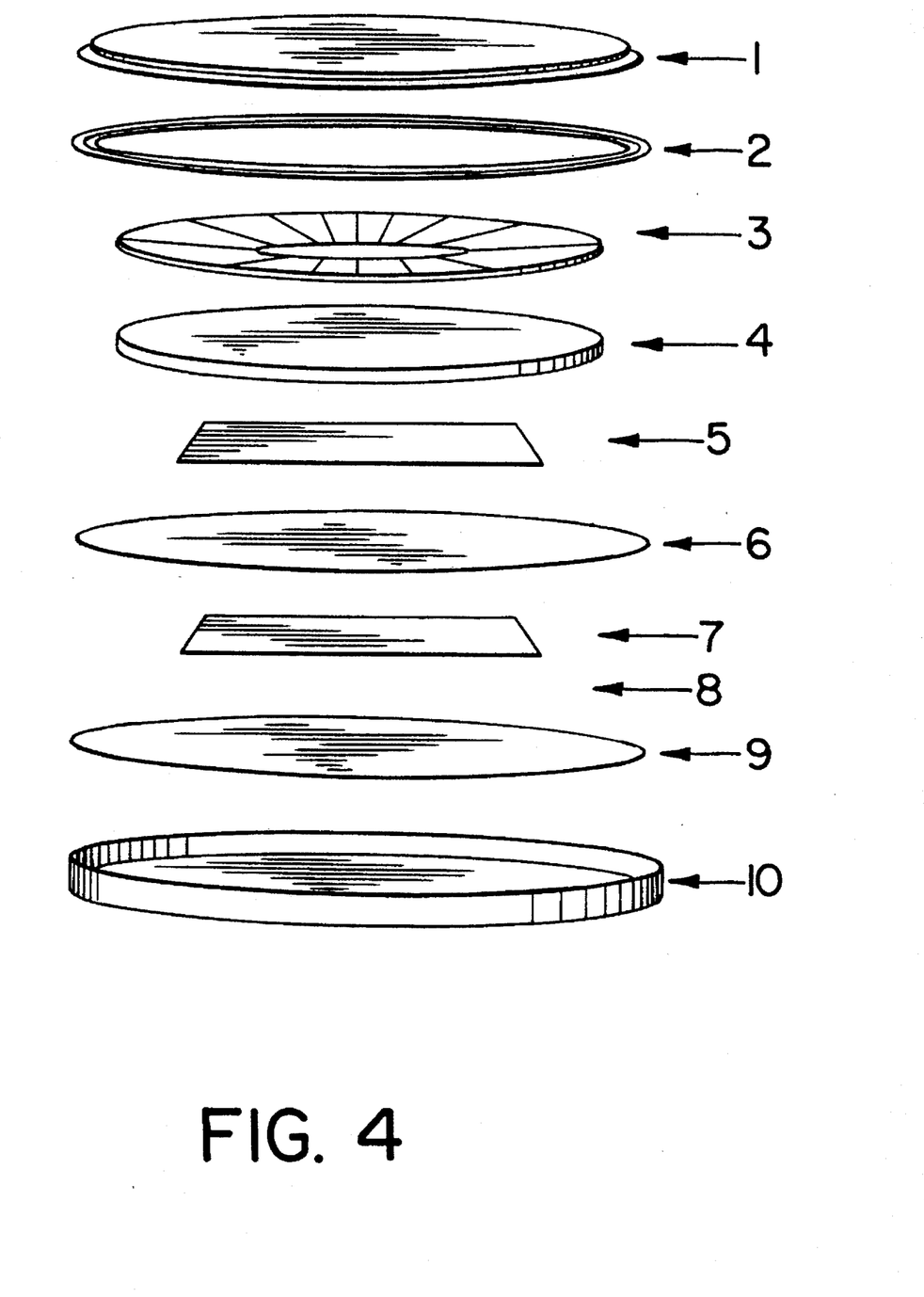
FIG. 4 shows an exploded view of the laboratory coin cell type battery used in the Examples.

Coin cell type batteries were assembled using conventional 2325 hardware and with assembly taking place in a glove box as described in J. R. Dahn et al, Electrochimica Acta, 38, 1179 (1993). FIG. 4 shows an exploded view of the coin cell type battery. A stainless steel cap 1 and special oxidation resistant case 10 comprise the container and also serve as negative and positive terminals respectively. A gasket 2 is used as a seal and also serves to separate the two terminals. Mechanical pressure is applied to the stack comprising the lithium anode 5, separator 6, and cathode 7 by means of disc spring 3 and stainless disc 4.

The case 10 was made from Shomac 30-2 (trademark) which is a conventional oxidation resistant grade of stainless steel. Experience has shown that it is acceptable for use in battery experiments up to 4.5 V and up to 30° C. Above these values, slow oxidation of the case 10 material occurs. In an attempt to minimize this corrosion when evaluating the high voltage invention batteries, an additional sheet of aluminum foil 9 was inserted between the cathode 7 and the case 10. The foil 9 completely covered the inside surface of the case 10 in order to minimize the exposure of the case 10 to the electrolyte 8.

The special cell type used for x-ray diffraction analysis had similar electrochemical components to the above coin cell type but employs a special container with a beryllium x-ray window such that the crystal structure of the cathode material can be monitored as a function of state of charge. This type of battery and method are described in Dahn et al, Can. J. Phys. 60, 307 (1982). A powder diffractometer with a Cu target x-ray tube was used. Both $K\alpha_1$ and $K\alpha_2$ wavelength radiation emanated from said tube.

Coin cell batteries were thermostatted at 30°±1° C. before testing and were then charged and discharged using constant current cyclers with ±1% current stability. Currents were adjusted such that a change in x of magnitude 1 in the compound $Li_xM_yN_zO_4$ would take 50 hours, hence the cycling rate is called a 50 hour rate. Data was logged whenever the cell voltage changed by more than 0.005 V. Special cells for x-ray diffraction analysis were tested in a similar manner except at ambient temperature.

EXAMPLE 1

Figure 5:
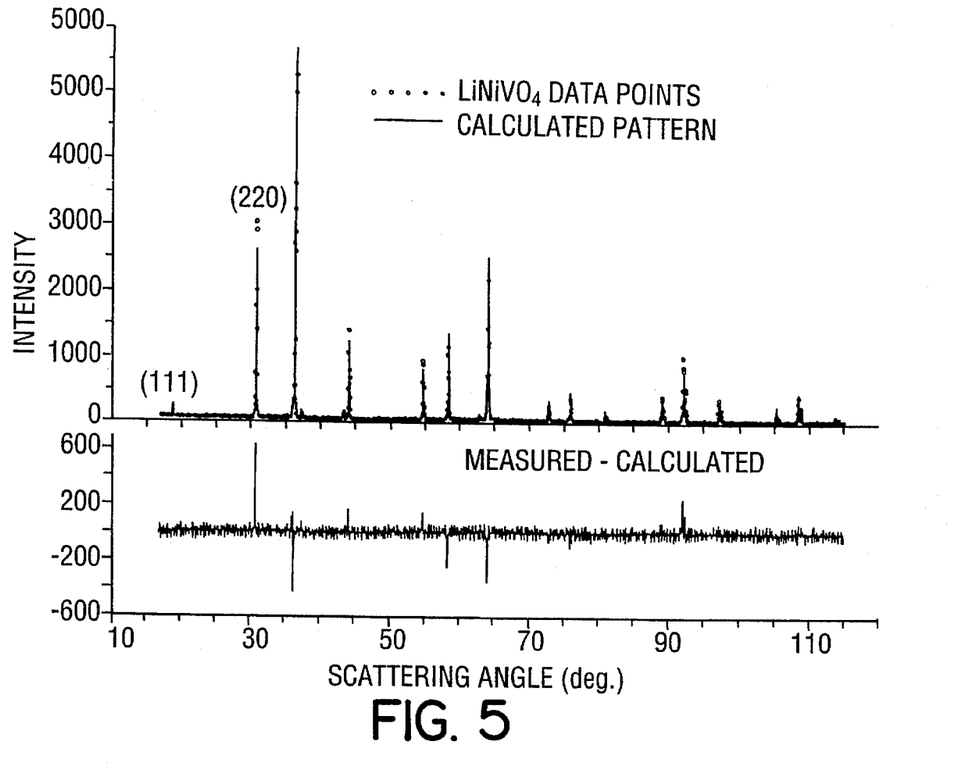
FIG. 5 shows the x-ray diffraction patterns for the synthesized and calculated LiNiVO$_4$ of Example 1, plus the difference between these patterns on an enlarged scale.

$LiNiVO_4$ was synthesized by reacting stoichiometric amounts of $LiNiO_2$ and $V_2O_3$ in air at 800° C. The powder x-ray pattern of this material was obtained and the data points are indicated by the open circles in FIG. 5. The pattern agrees well with the literature given by JCPDS card 38-1395. Also shown as a solid line in FIG. 5 is a calculated pattern assuming the inverse spinel structure described previously. The difference between the patterns of the synthesized material and the calculation is shown in the same Figure on an enlarged scale.

The key feature identifying the inverse spinel structure is the ratio of the intensities of the {111} and {220} peaks. For inverse spinels (with the Li atoms sharing the 16*d* or octahedral sites with half the transition metals), the {220} peak is much stronger than the {111} peak. For normal spinels (with the Li atoms in 8*a* or tetrahedral sites) like $LiMn_2O_4$, the {111} peak is the strongest peak in the pattern and the {220} peak is very weak. Although the patterns of the synthesized material and the calculation in FIG. 3 do not agree exactly, the agreement is sufficient to prove that the material has Li atoms predominantly in 16*d* sites. The calculation was made using Hill and Howard's version (J. Appl. Crystallography, 18, 173 (1985)) of the Rietveld (J. Appl. Cryst., 2, 65 (1969)) program. The cubic lattice constant of our material is 8.225(1)Å, in good agreement with the literature value of 8.2198(2)Å (JCPDS card 38-1395).

A special cell for x-ray diffraction analysis was assembled using this synthesized $LiNiVO_4$ material as the cathode and using electrolyte A. The cell was mounted in a powder diffractometer and x-ray profiles were continually recorded as the cell charged and discharged. The {137,355} Bragg peak near 92.0° in scattering angle is relatively strong and occurs at high scattering angle. This peak is hence very sensitive to changes in the crystal lattice dimensions. Although all the strong peaks were measured, for simplicity only the results for the {137,355} peak are presented. (The results obtained from an analysis of the other peaks are the same as that obtained from this peak.) The cubic lattice constant, a, of $Li_xNiVO_4$ can be obtained from the Bragg law using $$a = \sqrt{59} * \lambda/(2 \sin(\phi_{137,355}/2))$$

where $\lambda = 1.54056$Å is the copper $K\alpha_1$ wavelength and $\phi_{137,355}$ is the scattering angle of the {137,355} peak at the $K\alpha_1$ wavelength. If the scattering angle of this peak changes with x, then so does the lattice constant. Reversible changes in the lattice constants of insertion compounds often occur when the amount of inserted atoms is changed. Therefore, if x in $Li_xNiVO_4$ is changed when a $Li/LiNiVO_4$ cell is charged or discharged electrochemically, changes in the lattice constant are expected to be seen. Conversely, if changes in the lattice constant are observed, it proves that the lithium concentration has been varied.

Figure 6:
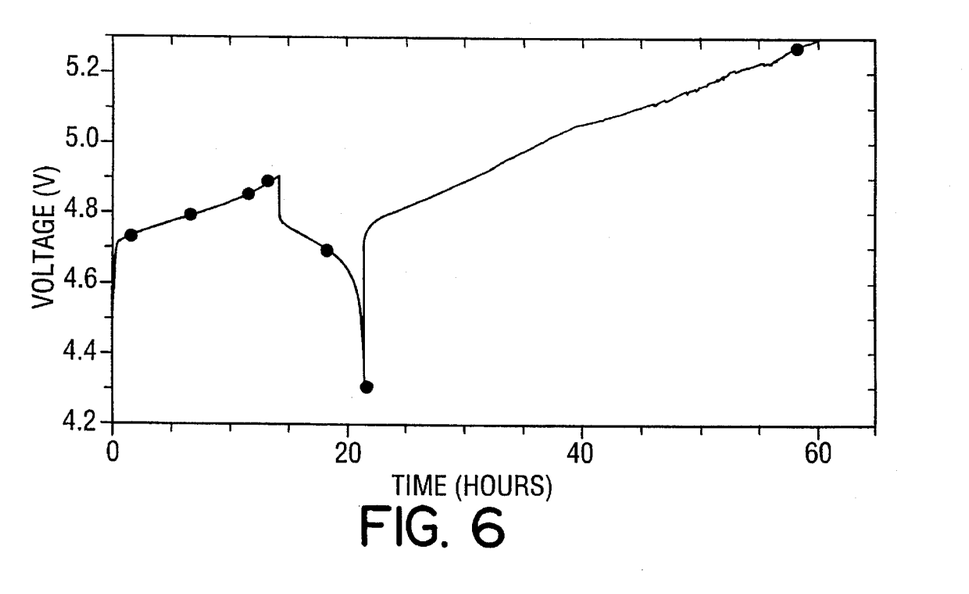
FIG. 6 is a plot of the voltage versus time behaviour of the Li/LiNiVO$_4$ coin cell of Example 1. The black dots indicate the points at which the x-ray scans of FIG. 7 were obtained.
Figure 7:
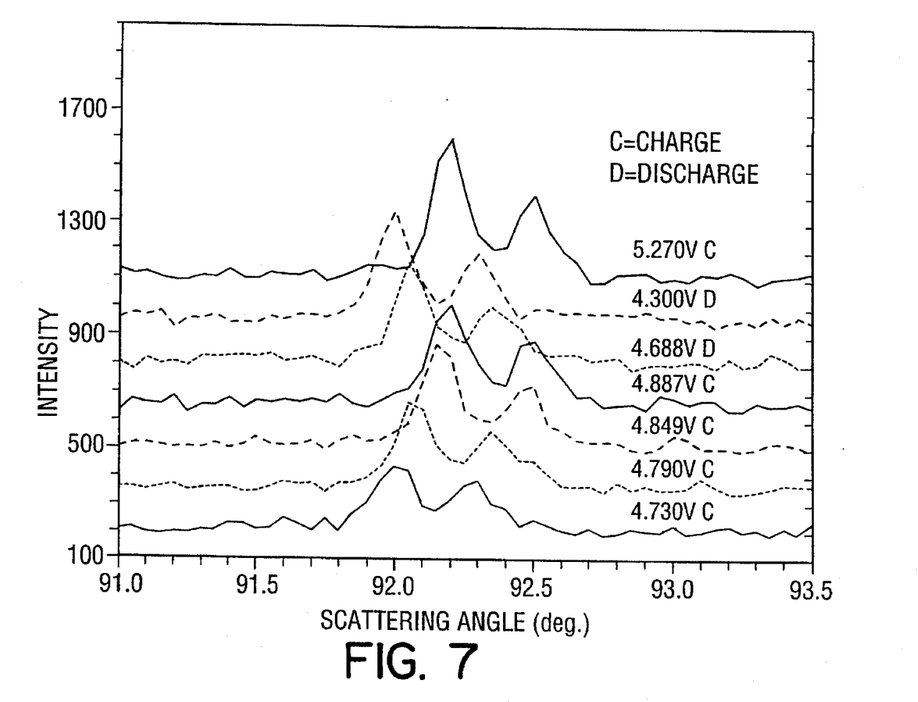
FIG. 7 depicts the x-ray diffraction patterns of the Li$_x$-NiVO$_4$ cathode in the cell of Example 1, at various points during cycling, in the neighborhood of the {137,155} peak. The points at which these x-ray scans were taken are indicated by the black dots in FIG. 6.

FIG. 6 shows the voltage versus time behaviour of a $Li/LiNiVO_4$ cell charged to 4.9 V (removing Li from $Li_xNiVO_4$), then discharged to 4.3 volts, and finally charged to 5.3 V. X-ray scans of the {137,355} peak taken at the voltages and times indicated by the black dots in FIG. 6 are shown in FIG. 7. The {137,355} peak clearly shifts to higher angle as the cell is charged to 4.9 V, then returns to its original position as the cell is discharged to 4.3 V. When the cell is charged above 4.9 V, capacity is observed, but no further shifting of the Bragg peak is observed beyond that measured at 4.9 V. Thus, the cell capacity above 4.9 V is thought to arise predominantly from electrolyte oxidation, not from electrochemical de-intercalation of the lithium from $Li_xNiVO_4$. Below 4.9 V, the lattice constants shift reversibly, consistent with an intercalation or insertion reaction. Undoubtedly, some electrolyte oxidation also occurs below 4.9 V, but this is at a rate small enough for a few charge-discharge cycles to be measured. After the cell was charged to 5.3 volts, it had no discharge capacity at the current rate used (50 hour rate). A possible explanation for this phenomenon is that the electrolyte may have been completely oxidized. The $Li_xNiVO_4$ was not destroyed during charging to 5.3 V as shown by the top scan in FIG. 7.

This example demonstrates that Li in $Li_xNiVO_4$ can be reversibly extracted and inserted near 4.75 V versus Li metal. Thus, $LiNiVO_4$ offers a voltage advantage approaching 20% over $LiMn_2O_4$.

EXAMPLE 2

Figure 8:
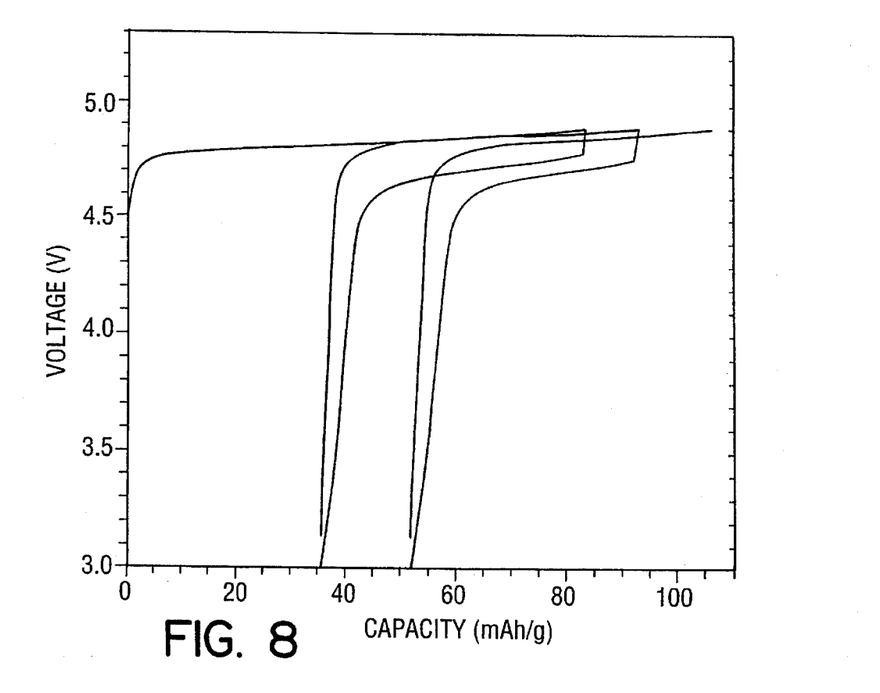
FIG. 8 is a plot of the voltage versus capacity of the coin cell of Example 2.

A coin cell type $Li/LiNiVO_4$ battery was constructed using cathode material as synthesized in Example 1 and using electrolyte A. This battery was cycled between 3.0 and 4.9 volts. FIG. 8 shows the cell voltage plotted versus capacity. Up to about 80 mAh/g of cathode capacity is attained during the first charge to 4.9 V, but only about 45 mAh/g of cathode capacity is attained during the next discharge. This is far smaller than the theoretical capacity expected for $LiNiVO_4$ (148 mAh/g if all the lithium can be extracted and re-inserted). However, the discharge capacity demonstrated herein constitutes a lower bound on the actual capacity that might be achieved from the material.

The shifting of the charge-discharge cycle curve in FIG. 8 is indicative of more coulombs being consumed on charge than is returned on the following discharge. The significant irreversible capacity loss between the first charge and discharge (about 35 mAh/g in total) and the further significant shifting of cycle curves may be due to electrolyte oxidation at these high voltage levels.

This example demonstrates that reasonable reversible capacity can be attained in a high voltage lithium battery employing $LiNiVO_4$ as a cathode material. The maximum performance achievable may be limited by the electrolyte and/or hardware employed.

EXAMPLE 3

Figure 9:
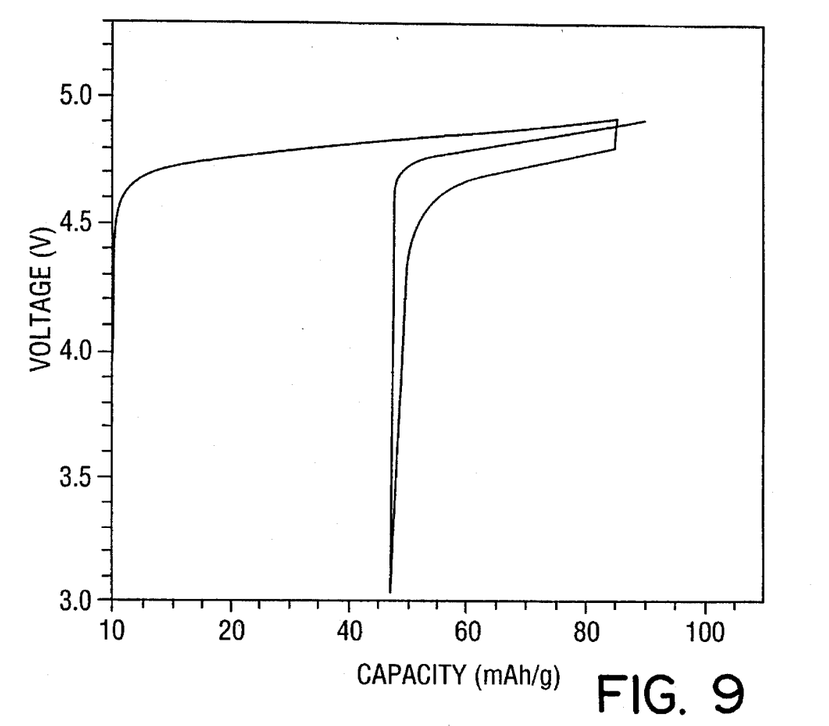
FIG. 9 is a plot of the voltage versus capacity of the coin cell of Example 3.

A coin cell battery similar to that of Example 2 was assembled except that electrolyte B was used. The battery was initially charged to 4.9 V, discharged to 3.5 V, and then charged again to 4.9 V. The voltage versus capacity curve for this battery is shown in FIG. 9 and is similar to that for the battery in Example 2.

Figure 10:
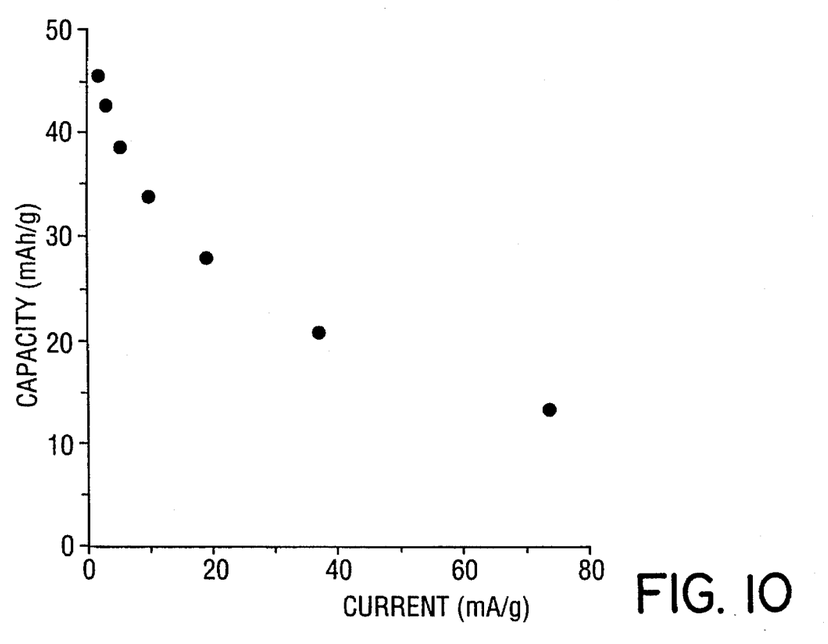
FIG. 10 is a plot of the capacity versus discharge rate of the coin cell of Example 3.

The battery then underwent multiple discharges to 3.5 V using decreasing constant current steps to generate the capacity versus discharge rate data shown in FIG. 10. The initial discharge rate was equivalent to about 73 mA/g. Five minute equilibration periods were used in between discharges, and a total of 7 measurements at discharge rates of $73/2^n$ mA/g where n=0 to 6 were made.

This example demonstrates that this invention battery can be operated at a reasonable rate.

EXAMPLE 4

Figure 11:
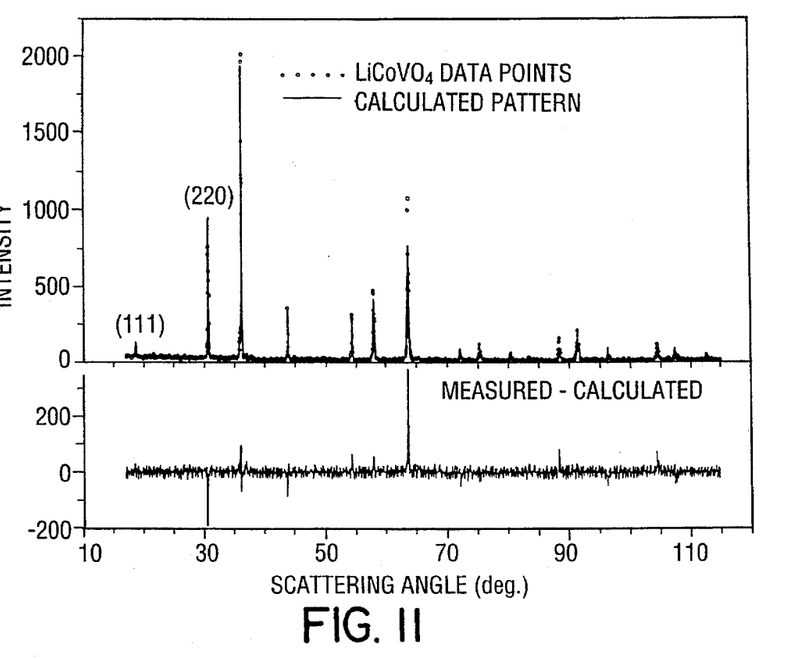
FIG. 11 shows the x-ray diffraction patterns for the synthesized and calculated LiCoVO$_4$ of Example 4, plus the difference between these patterns on an enlarged scale.

$LiCoVO_4$ powder was synthesized by reacting stoichiometric amounts of $LiCoO_2$ and $V_2O_3$. The powders were ground together and were then pressed into a pellet using a pressure of about 1000 bar. The pellet was reacted in air at 600° C. for two hours and then at 700° C. for 30 minutes. The x-ray diffraction pattern for the synthesized $LiCoVO_4$ was obtained and the data points are indicated by the open circles in FIG. 11. A calculated pattern for $LiCoVO_4$ (using the methods described previously) is also shown by a solid line. The difference between the patterns of the synthesized material and the calculation is also shown on an enlarged scale. Again, this material is also an inverse spinel, with the majority of the Li atoms in 16d sites.

Figure 12:
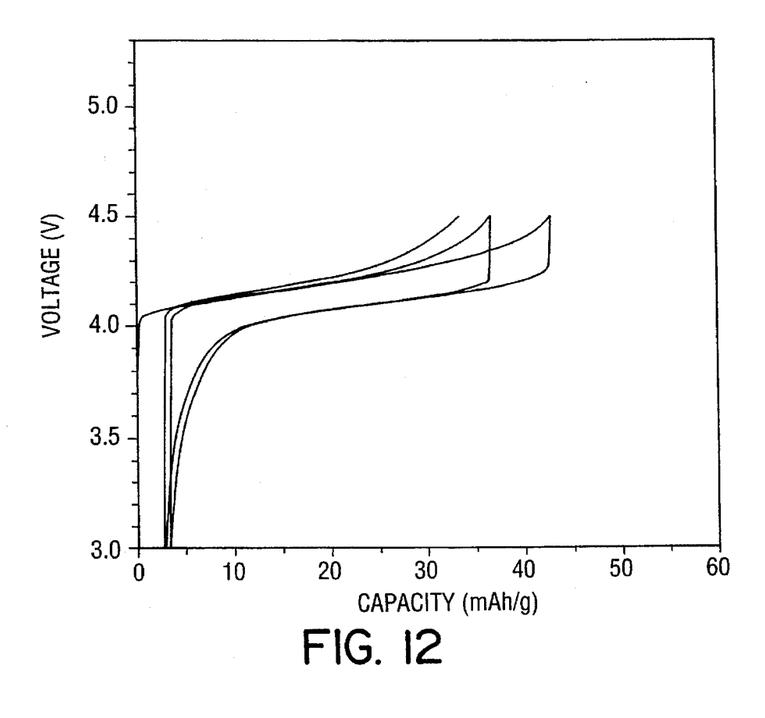
FIG. 12 is a plot of the voltage versus capacity of the coin cell of Example 4.

A coin cell type battery was assembled using this synthesized $LiCoVO_4$ as the cathode material and using electrolyte B. The battery was cycled repeatedly between 3.0 V and 4.5 V. The voltage versus capacity curves for this battery are shown in FIG. 12. Reversible capacities of about 40 mAh/g were obtained. When the battery was charged to 4.9 V, no increase in the subsequent discharge capacity was obtained. Significantly less irreversible capacity loss was seen between the first charge and discharge and less shifting of the charge-discharge cycle curves from cycle to cycle was seen. This may be a result of reduced electrolyte oxidation, since the operating voltage of this battery was significantly less than that of the battery of Example 2.

Although the operating voltage of this $LiCoVO_4$ battery is lower than that of the battery of Example 2, this example still demonstrates that reasonable, reversible capacity can be obtained using this material.

As will be apparent to those skilled in the art in the light of the foregoing disclosure, many alterations or modifications are possible in the practice of this invention without departing from the spirit or scope thereof. For example, it may be found desirable to prepare batteries wherein other materials are employed in the cathode along with an inverse spinel. Additionally, it may be desirable to substitute minor amounts of other elements for the transition metals of the inverse spinel compound. Accordingly, the scope of the invention is to be construed in accordance with the substance defined by the following claims.

What is claimed is:

1. A battery having an anode, a cathode and an electrolyte wherein a portion of the cathode comprises a solid solution compound having an inverse spinel structure and chemical formula $Li_xM_yN_zO_4$ wherein M and N are transition metals, y and z are numbers and are approximately 1, and x is a number in the range from about 0 to about 2.

2. A battery as claimed in claim 1 wherein the lithium transition metal oxide is $LiNiVO_4$, $LiCoVO_4$ or $LiCuVO_4$.

3. A battery as claimed in claim 1 wherein the anode is selected from the group consisting of a lithium metal, a lithium alloy, and a lithium insertion compound.

4. A battery as claimed in claim 1 wherein the electrolyte comprises one or more lithium salts dissolved in a mixture of non-aqueous solvents.

5. A battery as claimed in claim 4 wherein the electrolyte comprises $LiPF_6$ dissolved in a mixture of dimethyl carbonate, propylene carbonate, and ethylene carbonate.

6. A battery as claimed in claim 4 wherein the electrolyte comprises $LiBF_4$ dissolved in a mixture of dimethyl carbonate, propylene carbonate, and ethylene carbonate.

7. A battery as claimed in claim 1 wherein x is a number in the range from about 0 to about 1.

8. A battery as claimed in claim 7 wherein M is Ni and N is V.

9. A battery as claimed in claim 7 wherein M is Co and N is V.

10. A battery as claimed in claim 7 wherein M is Cu and N is V.

11. A battery having an anode, a cathode and an electrolyte wherein a portion of the cathode comprises a solid solution compound having an inverse spinel structure and chemical formula $Li_xM_yN_zO_4$ wherein M and N are transition metals, y and z are numbers and are approximately 1, and x is a number in the range from about 0 to about 2 wherein metals other than transition metals are partially substituted for M and N while maintaining said inverse spinel structure.

12. A cathode for a battery wherein a portion of the cathode comprises a solid solution compound having an inverse spinel structure and chemical formula $Li_xM_yN_zO_4$ wherein M and N are transition metals, y and z are numbers and are approximately one, and x is a number less than one.

13. A cathode as claimed in claim 12 wherein M is selected from the group consisting of nickel, cobalt and copper and N is vanadium.

14. A cathode for a battery comprising at least in part a lithium transition metal oxide having an inverse spinel structure and chemical formula $Li_xM_yN_zO_4$ wherein M and N are transition metals, y and z are numbers and are approximately one, and $1 < x \leq 2$.

15. A cathode as claimed in claim 19 wherein M is selected from the group consisting of nickel, cobalt and copper and N is vanadium.

* * * * *

UNITED STATES PATENT AND TRADEMARK OFFICE
CERTIFICATE OF CORRECTION

PATENT NO.   : 5,518,842
DATED        : May 21, 1996
INVENTOR(S)  : Fey et al.

It is certified that error appears in the above-identified patent and that said Letters Patent is hereby corrected as shown below:

Column 10, line 56, within claim 15, "19" should read --14--.

Signed and Sealed this

Twenty-seventh Day of August, 1996

Attest:

BRUCE LEHMAN

*Attesting Officer*              *Commissioner of Patents and Trademarks*